Aug. 21, 1934.    F. FAUSETT    1,971,099
OSCILLATION SUPPRESSOR FOR RADIO TESTING APPARATUS
Filed June 6, 1932
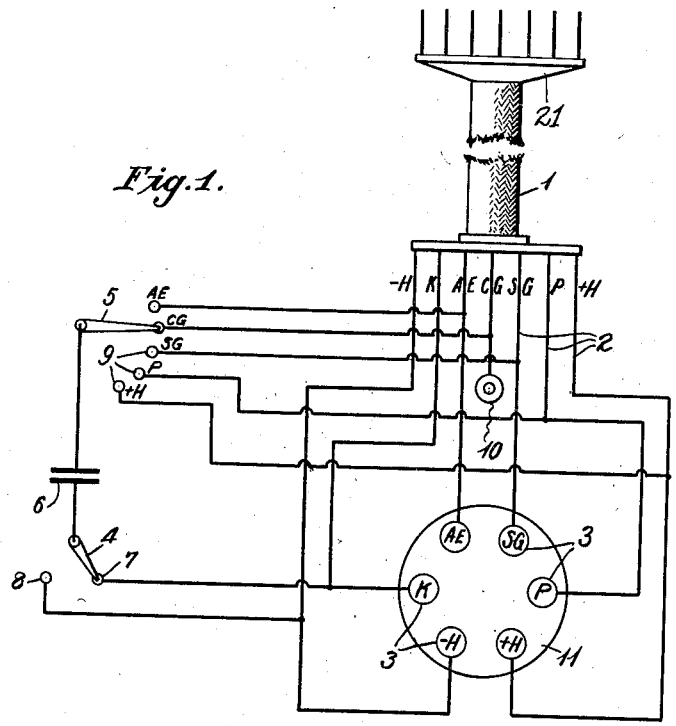
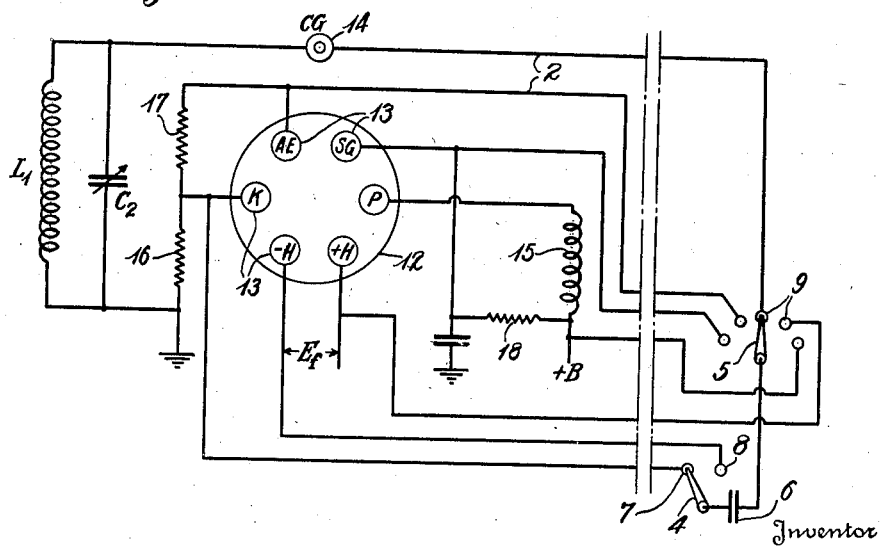
Inventor
*Floyd Fausett*
By *Knights Bros*
Attorneys Patented Aug. 21, 1934

1,971,099

UNITED STATES PATENT OFFICE 1,971,099

OSCILLATION SUPPRESSOR FOR RADIO TESTING APPARATUS

Floyd Fausett, Greenwood, Miss., assignor to Supreme Instruments Corporation, Greenwood, Miss.

Application June 6, 1932, Serial No. 615,711

3 Claims. (Cl. 250—20)

This invention relates to an improvement in radio testing apparatus and particularly relates to an arrangement for transferring without change the circuit conditions existing in a radio receiver to a testing circuit.

An object of the invention is to provide a simple arrangement for maintaining the circuits of a radio receiver, in the course of testing thereof, in a stable condition in order that the results of the test give a true indication of the circuit conditions in the receiver. In well designed radio receivers, the circuits are electrically balanced and metallic shielding is employed to prevent such electrical interactions between the circuits as would impair the efficient functioning of the circuits. Any disturbance of the electrical balance or shielding arrangement may cause an interaction which would cause one or more of the amplifying circuit networks to go into an oscillatory state. For instance, the normal function of a vacuum tube as an amplifier might be so affected by an unbalanced electrical condition that the tube would cease to function as an amplifier and function instead as an oscillation generator. The impedance of a tube as an amplifier may be radically changed when the tube is caused to generate oscillations, so that the readings of a tube socket tester would be correspondingly radically changed.

It is found that the use of the tester often affects the characteristics of a normal tube socket circuit network to an extent which unbalances the radio circuits, setting up the conditions described above. Furthermore, in order to connect the tester in many types of radios, it is necesary to remove part of the radio chassis shielding, thereby aggravating the unbalanced conditions which affect the electrical values to be measured. These conditions are so pronounced in some radio designs that it is practically impossible to use the tester without the use of this invention.

The convential methods for testing a radio receiver include the use of a tube socket tester which is, essentially, an extension of the circuits which normally terminate with the contacts of a radio receiver tube socket. The basic assembly of a tester of this type consists of an analyzing plug with conventionally arranged tube base terminals properly connected with cabled conductors to the terminals of a tube socket or sockets, on the panel of the tester, with the necessary tester switching arrangement for connecting a meter, or meters, across or in series with the cable circuits for effecting electrical potential or current measurements. The invention in this case consists of the incorporation of a capacitor as part of the tester circuits. This capacitor element may be selectively switched onto the various circuits under test and serves to prevent the setting up of an oscillatory condition in the radio tuning circuits as extended by the cabled conductors to the tester circuits. Thus when this capacitor is associated with the input circuit of one of the stages of a radio receiver, it is, in effect, connected in parallel with the radio tuning capacitor, so that (1) the natural frequency period of the tuning circuit is made considerably lower than those frequency ranges which may be critical or troublesome in unbalanced circuits, and (2) the capacitor thus added by the tester tends to offer a path of very low reacting impedance across the tuning circuit. This added capacitor acts practically as a short circuit for high frequency electrical energy, without affecting the direct potentials applied to the tube by the radio receiver, or by the tester in connection with its tube testing functions. The use of a conductor, resistor or inductor would not accomplish the desired results without affecting these applied direct potentials. Likewise the connection of this capacitor in any of the other parts of the circuit makes possible the transference of the potentials existing in the radio receiver circuit to the tester circuits with the exclusion of any extraneous effects.

Other objects and purposes will appear from the following detailed description of the invention taken in conjunction with the accompanying drawing in which:

Fig. 1 shows a portion of the testing apparatus embodying my invention, and

Fig. 2 shows a stage of a radio receiver with the conductors for connecting the circuit elements of the radio receiver to a portion of a suitably designed testing apparatus.

In Fig. 1 is shown a cable sleeving element 1 having a plurality of conductors 2 contained therein. These conductors, indicated in the drawing as —H, K, AE, CG, P and +H, lead from the contact terminals of an analyzing plug 21 which is adapted to be inserted in the tube socket of a radio receiver. These conductors serve to transfer the potentials of the radio receiver to the testing apparatus wherein they terminate in the coresponding socket terminals 3 adapted to receive the tube of the stage of the radio receiver under test. These conductors correspond respectively to the terminals of the negative filament or heater, cathode, auxiliary electrode, control grid, screen grid, plate, and positive filament or heater. The conductor 2 corresponding to the control grid element terminates at the tester in a clip 10 adapted to engage the control grid terminal at the top of the tube. As many sockets 11 as are desired may be provided in the panel of the testing apparatus and parallel connections between their terminals may be suitably made. In the drawing are shown two switch contact points 7 and 8 connected respectively to the cathode terminal and the negative heater. Either one of these terminals may be selectively connected to one side of the suppressing capacitor 6 by means of switch element 4, in dependence upon the type of tube employed. The other side of the suppressing capacitor 6 is connected to a switch member 5 which may selectively engage the contacts 9 conencting with the conductors AE, CG, SG, P, and +H. In the diagram as shown in Fig. 1, an indirectly heated tube is employed and the condenser 6 is shown connected in the input circuit of the radio receiving stage under test between the cathode K and the control grid CG. As is readily apparent, this condenser may be connected across any other portion of the circuit having the cathode element as a reference point. Since the instant invention is not concerned with the specific construction of the tubes or the circuits in which they may be incorporated, a plurality of the electrode terminals across which the capacitor 6 may be switched is merely indicated. The auxiliary electrode may be in the form of a shield grid, suppressing element, or the like, and the absence thereof in the simpler types of circuits in nowise affects the essence of the instant invention.

Fig. 2 shows a simple form of a stage of a radio receiver and the part of the testing apparatus which incorporates the capacitor 6. The socket of the radio receiver is indicated at 12, the terminals 13 of which are engaged by those of the analyzing plug to effect the connections between the radio receiver at the left portion of the figure, and the testing apparatus, at the right, by the conductors 2. The conductor 2 for transferring the potential of the control grid terminates in a clip or equivalent means as an adjunct to the analyzing plug for engaging with the control grid contact 14. A suitable power source for energizing the plate is indicated at +B and one for energizing the filament or heater at Ef.

The input circuit comprising inductance $L_1$ and capacitor $C_2$ is tuned by the latter. The output inductance is indicated at 15, and a potential reducer for the screen grid element is shown at 18. Element 16 represents a biasing resistor and in the case that a circuit employing an auxiliary electrode is operated, a resistor 17 is shown schematically associated therewith. All these potentials are transferred to the testing apparatus, at which point condenser 6 may be selectively connected either across the cathode terminal in case that indirectly heated tubes are employed, or across the negative filament terminal in the event that a filamentary cathode is used for the electron emission source, and the other terminals of the tube. The effect of this switching of the condenser is to place the same in parallel with the circuits associated with the tube terminals, thereby enabling the determination of the various potential conditions and at the same time stabilizing the various circuits so that the arising of conditions other than those normally existing in the radio receiver are rendered impossible.

Having described my invention,

I claim:

1. In a radio testing apparatus, the combination of testing means having a plurality of contacts adapted to be connected to the terminals associated with a tube socket of a radio receiver, a plurality of conductors extending from said contacts to a radio tube socket in said testing apparatus, a condenser associated with said conductors, and means for selectively bridging said condenser across the circuits of said radio receiver to maintain stability of the radio receiver circuits in the course of testing thereof.

2. In a radio testing apparatus, the combination of testing means having a plurality of contacts adapted to be connected to the terminals associated with a tube socket of a radio receiver including the terminal contacting with the electron-emitting element in said tube, a plurality of conductors extending from said contacts to a radio tube socket in said testing apparatus, some of said conductors furthermore having shunt extensions terminating in switch terminals, a circuit-making member selectively contacting said last-mentioned terminals, and a condenser electrically connected between said member and the conductor extending from the tube terminal contacting with the electron-emitting element, adapted to be selectively bridged between said last-mentioned element and said switch terminals to maintain stability in the course of testing the radio receiver.

3. In a radio testing apparatus, the combination of testing means having a plurality of contacts adapted to be connected to the terminals associated with a tube socket of a radio receiver, said contacts being adapted to tube sockets for tubes having indirectly heated cathodes or directly heated filaments, a plurality of conductors extending from said contacts to a radio tube socket in said radio testing apparatus, said conductors furthermore having shunt extensions terminating in switch terminals, a circuit-making member selectively contacting the switch terminals connected with the tube terminals associated with the cathode and filament elements, another circuit-making member selectively contacting the remainder of the switch terminals, and a condenser connected between said circuit-making members adapted to be selectively bridged between the electron-emitting element and the remaining elements of the tube in the tube socket to maintain stability in the course of testing the radio receiver.

FLOYD FAUSETT.